United States Patent [19]

Clark

[11] Patent Number: 5,083,122
[45] Date of Patent: Jan. 21, 1992

[54] PROGRAMMABLE INDIVIDUALIZED SECURITY SYSTEM FOR DOOR LOCKS

[75] Inventor: Keith S. Clark, Sunnyvale, Calif.

[73] Assignee: OSI Security Devices, Sunnyvale, Calif.

[21] Appl. No.: 312,791

[22] Filed: Feb. 21, 1989

[51] Int. Cl.$^5$ .............................................. H04Q 9/00
[52] U.S. Cl. ........................... 340/825.32; 340/825.31; 70/278; 361/172
[58] Field of Search ...................... 340/825.31, 825.32, 340/825.72; 70/278, 280, 144, 177; 361/172, 195; 235/380, 382, 382.5; 292/144, 60; 310/12, 15

[56] References Cited

U.S. PATENT DOCUMENTS

| | | | |
|---|---|---|---|
| 3,516,701 | 6/1970 | Graham | 292/144 |
| 4,148,092 | 4/1979 | Martin | 361/172 |
| 4,163,215 | 7/1979 | Iida | 340/825.31 |
| 4,218,690 | 8/1980 | Ulch et al. | 340/825.31 |
| 4,568,998 | 2/1986 | Kristy | 70/278 |
| 4,633,687 | 1/1987 | Fane | 70/278 |
| 4,642,726 | 2/1987 | Matsko et al. | 361/195 |
| 4,742,426 | 5/1988 | Lavelle | 361/172 |

*Primary Examiner*—Donald J. Yusko
*Assistant Examiner*—Edwin C. Holloway, III
*Attorney, Agent, or Firm*—Jacques M. Dulin; Thomas C. Feix

[57] ABSTRACT

A battery-powered security device for controlling access through a door by authorized uses which includes a lock operated by a low power driven motor; a keyboard by which a user enters codes or programming; a programmable circuit including a microprocessor, data memory and program memory. The device opens the lock in response to a correct code entered through the keyboard and/or to a chronological schedule enabled by a clock marking real time. An LED provides a wireless link to a hand-held printer so that the device may be programmed with access codes and time schedules and prints out a list of users and times of entry. The operative programs in memory can be added or modified by means of the keyboard. The coupling between the motor shaft and key plunger is designed to avoid accidental misuse such as a user holding the door handle while the motor is turning. The entire package—motor, lock, battery and circuitry,—is contained within a compact package approximately equal in maximum dimension to the length of a door handle and attaches to the door in the region of the handle with no additional modification of the door than is required for standard lock installations.

21 Claims, 5 Drawing Sheets

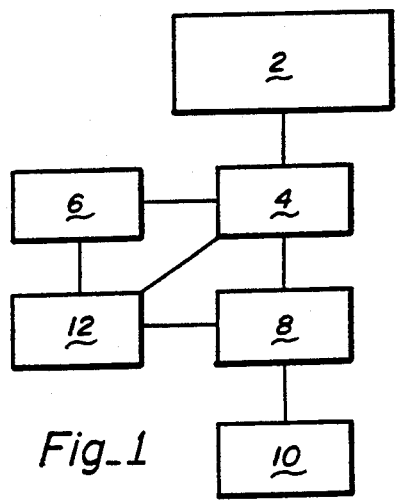
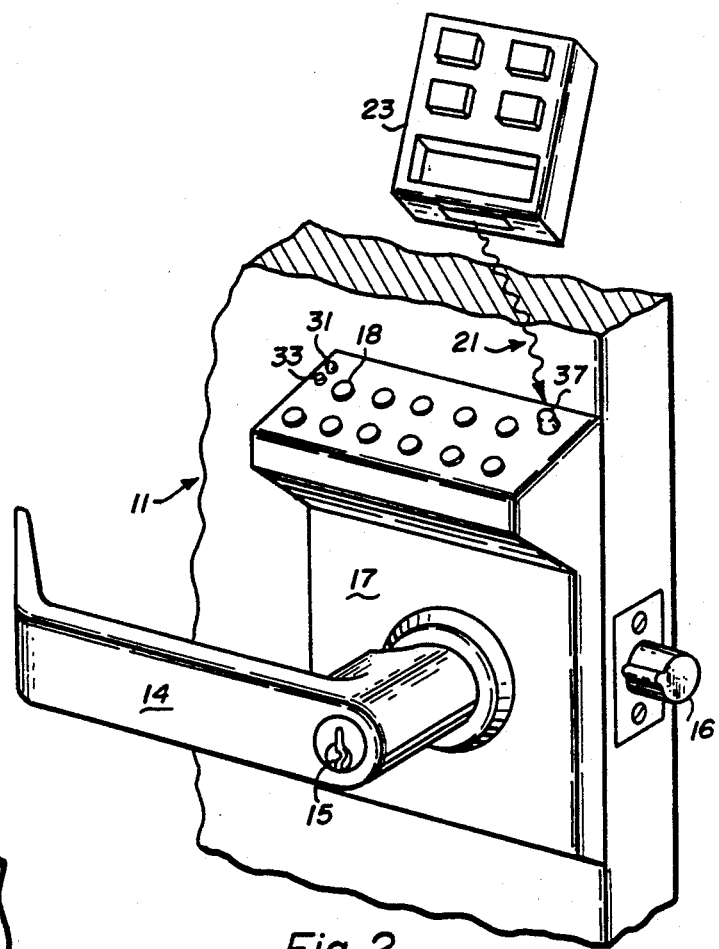
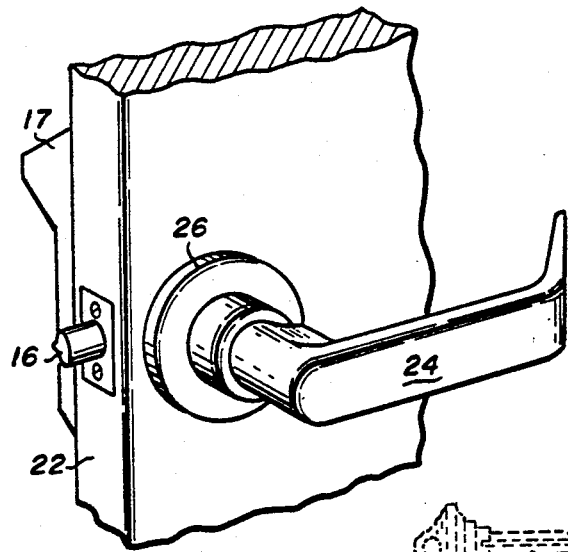
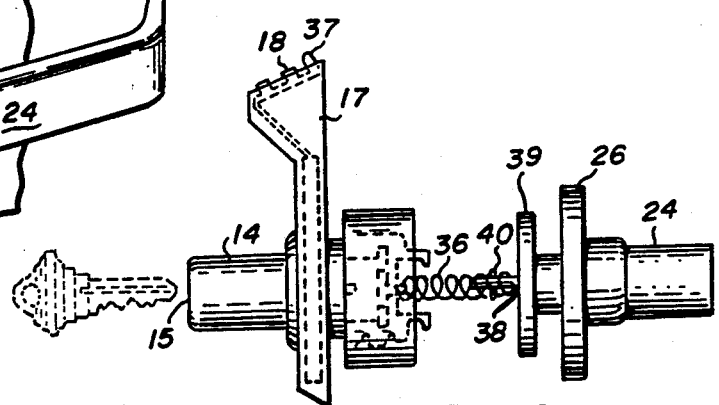
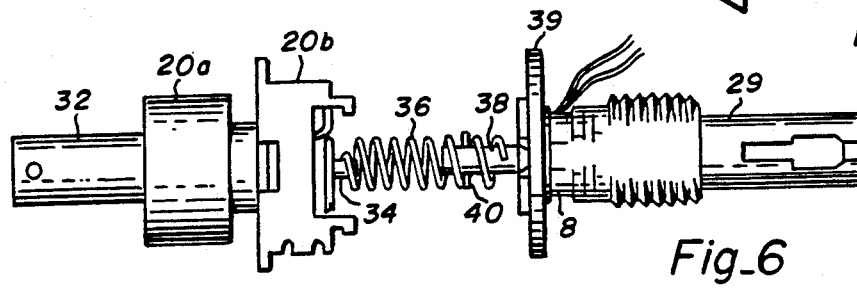
Fig_1
Fig_2
Fig_3
Fig_4
Fig_6

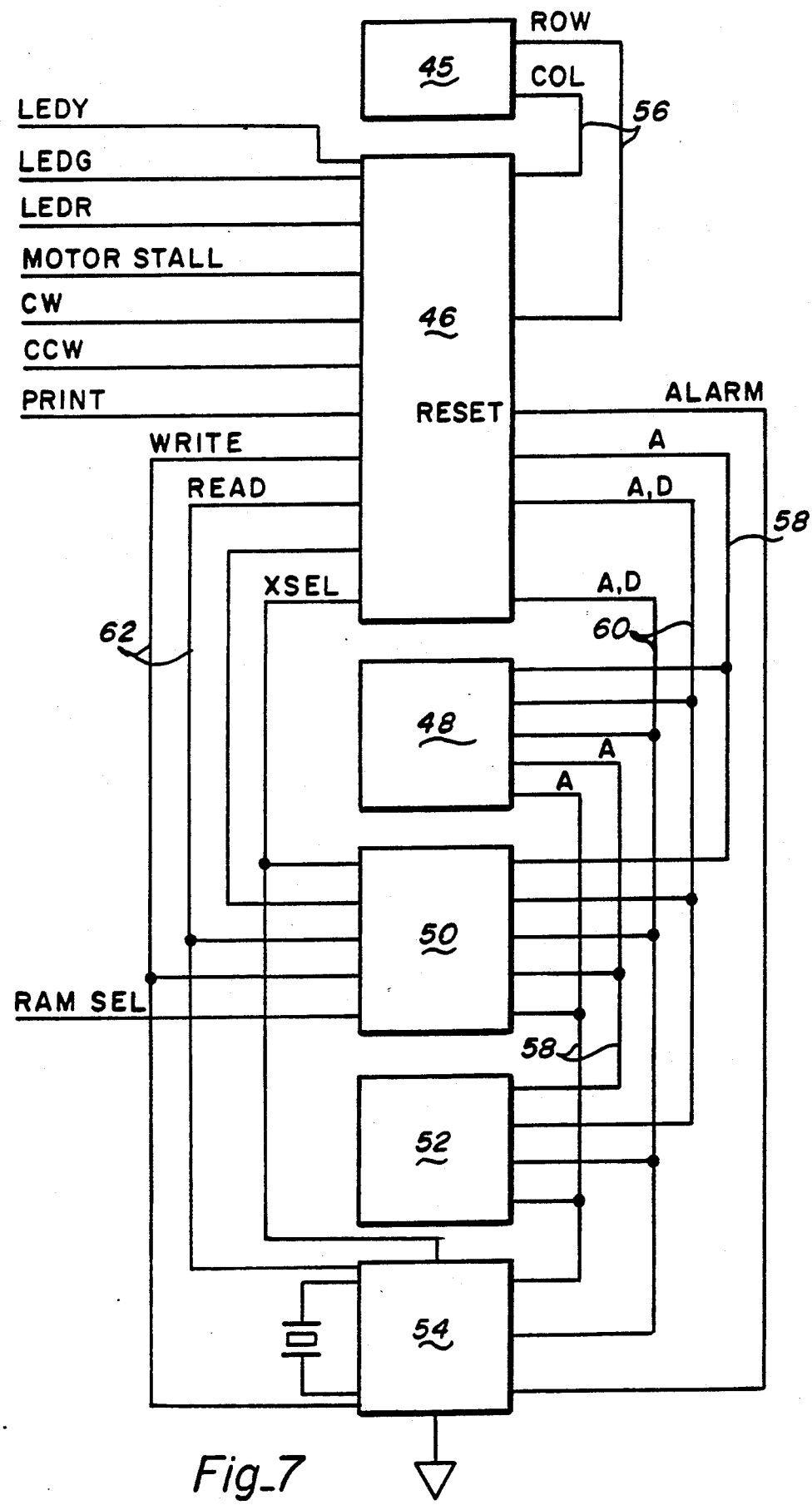
Fig_7

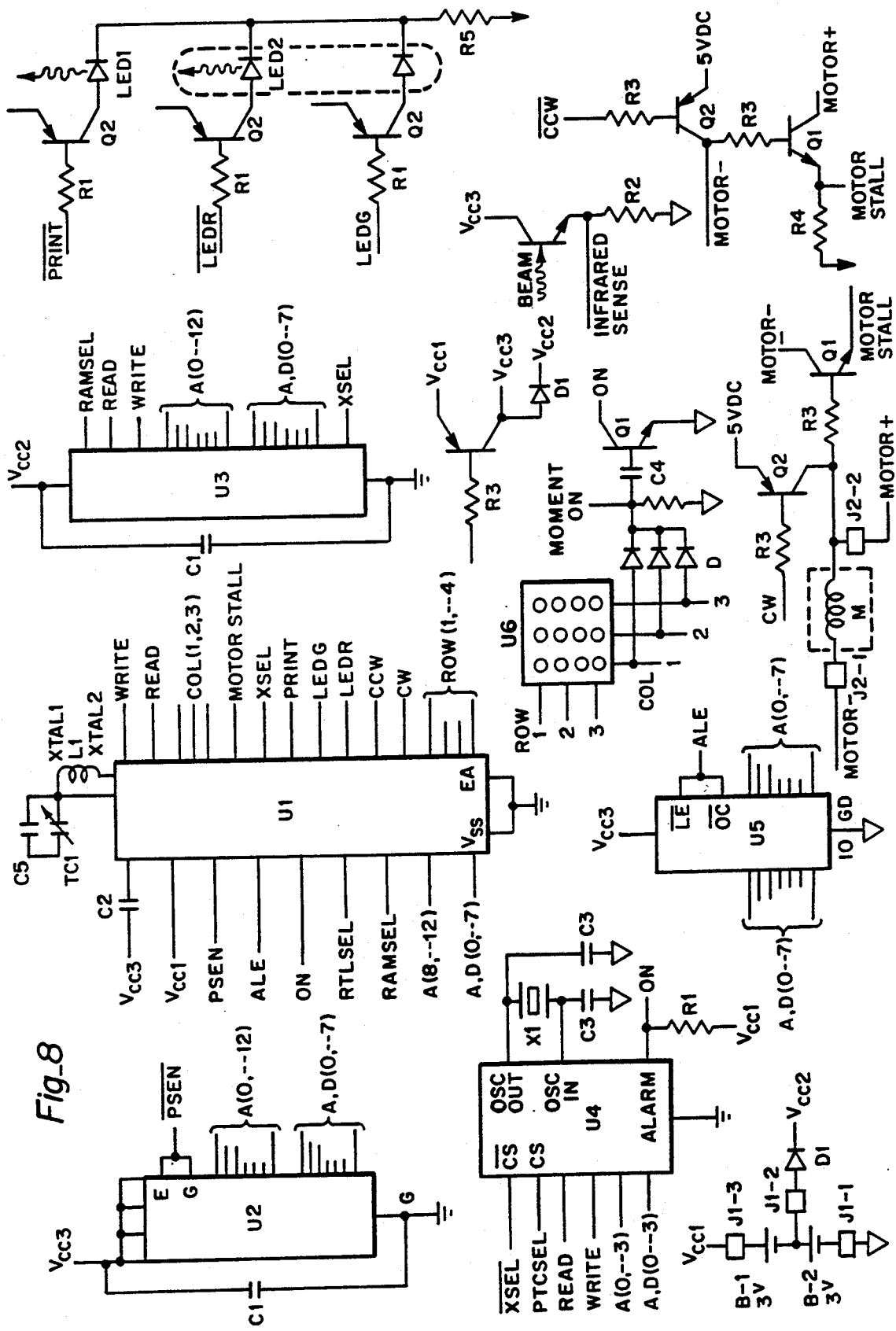
Fig_8

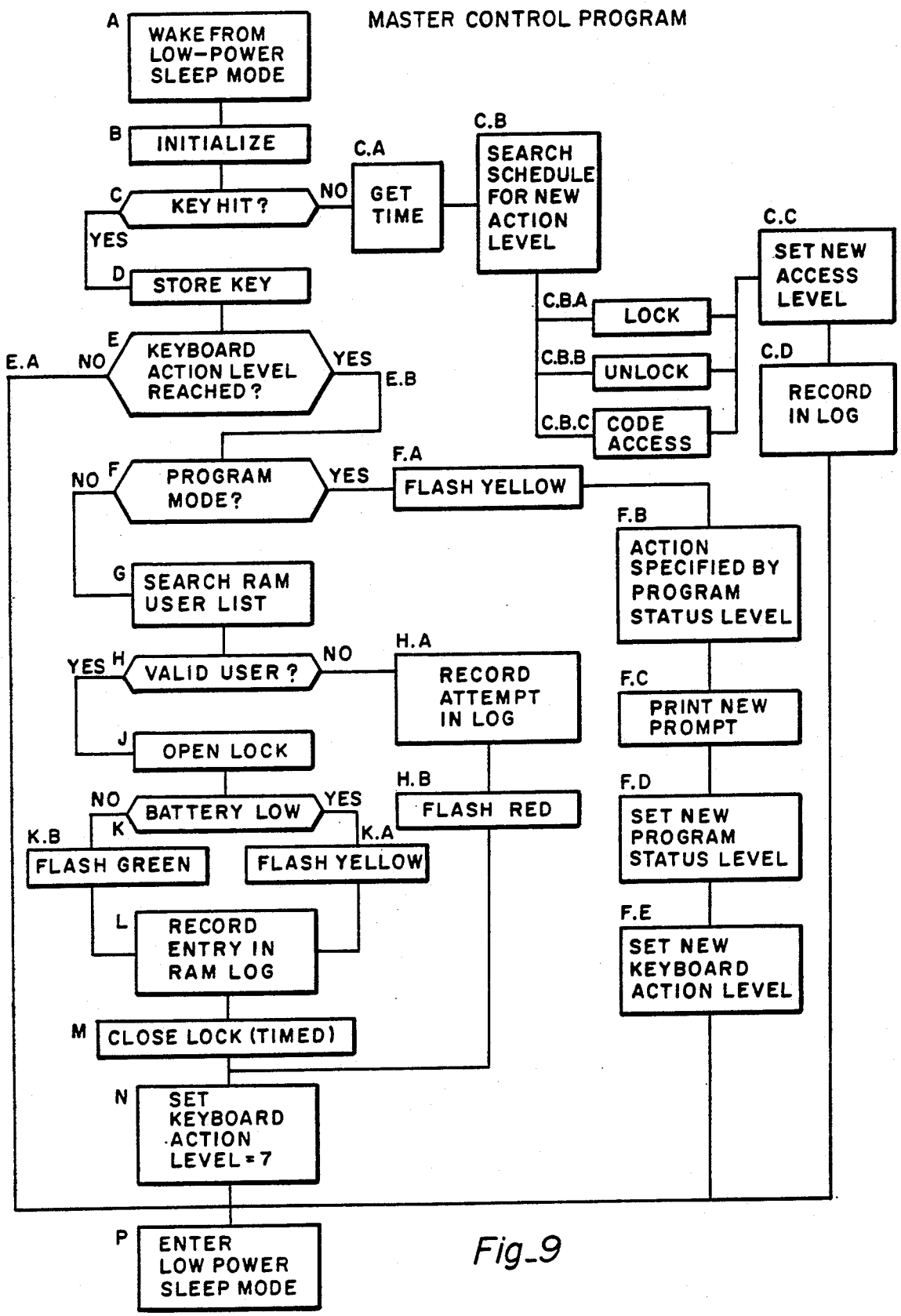
Fig_9

PROGRAMMABLE INDIVIDUALIZED SECURITY SYSTEM FOR DOOR LOCKS

FIELD

This invention relates to security systems for permitting controlled access through one or more doors by authorized individuals and in particular to an application where it is desired to record time of entry and identification of the individuals.

BACKGROUND:

The fierce competition that prevails in the present political and industrial scene has generated a need for controlling entry to large numbers of areas (through doors) by large numbers of authorized individuals. The problem is further exacerbated by the requirements that are unique to individual establishments, e.g., permitting only certain ones of an authorized group to enter certain areas, frequent recording of who entered a given area and when he entered, frequent turnover of a work force requiring security code changes, etc.

In response to these circumstances there has appeared on the market a number of security systems featuring the use of cards, push-buttons, dials etc., that activate locking systems and some of these systems include the use of linked printers that may be "plugged into" the lock to log entries, etc. For example, the DETEX Corp., of New Braunfels, Tex. offers an access control system for single doors that includes a combination keyboard-card access system to operate any one of five access modes, and the system can be hard wired into a printer which prints out entry data.

An approach to lock design that has been manufactured by Yale, Schlage, etc. for many years utilizes a key inserted into a key lock located in the shaft of an outside door handle. By turning the key, a barrel in the tubular shaft of the door handle is rotated. The end of the barrel facing the inside of the door is angled so that as the barrel rotates, a plunger engages the angled (or cam-like) end of the barrel and is forced to slide in the tubular shaft (outside spindle). The sliding plunger disengages from the door latch and unlocks the door. The other end of the plunger engages a spring loaded push button which projects from the tubular shaft (inside spindle) of the inside door handle. When it is desired to lock the door, the push button is pushed which forces the plunger back to the locking position.

An adaptation of this popular design has appeared on the market whereby the push-button has been replaced by a solenoid so that it can be operated by remote control. The use of a solenoid to replace the push-button has disadvantages, however, among which is its excessive use of power since the solenoid current must be maintained to hold the plunger open.

In summary, none of the systems of the prior art provide a compact self-contained construction that eliminates such inconveniences as high power drain, computer hookups, external wiring to add on components, extensive modification of the door, and versatility of programming that is featured in the present invention.

THE INVENTION

Objects:

It is an object of this invention to provide a security system for controlling access through a number of doors by a selectably variable group of authorized individuals.

It is another object of this invention that the security device for each door be self contained, i.e., devoid of a requirement for external connections such as power lines, etc., to computers, printers, etc., and may be mounted onto a standard door having standard cutouts for standard locks so that the need for extensive modification is eliminated It is another object that the self-contained security device affords convenience to the authorized user in terms of the ease with which he can present his entry signal, program the device, withdraw reports of entry, etc.

It is a further object of this invention that the security device include a dead bolt construction that is movable between locking and unlocking positions by electrical means rather than manual means so that versatile solid state controls can be employed to provide many alternate modes of operation.

It is a further object that the novel lock construction of this invention be characterized by simplicity, economy and a unique design that enables it to adjust to certain inadvertent actions by a user such as prolonged manually forcing the door handle toward either the locked or unlocked position without disrupting the programmed sequence of operations.

Yet another object is to provide a locking device which offers the advantages of popular conventional locks comprising an outside door handle with a keyed shaft, where the push button feature is replaced by an electrical locking means to move the key plunger between locking and unlocking position but does not require excessive use of power such as characterizes the solenoid-operated locks of the prior art.

Still another object is that the locking-unlocking function be initiated either by an individual providing a manual signal to a keyboard or a signal generated by a program that monitors a clock or by mechanical key.

It is another object that the initializing manual signal be one of a number of preselected and easily changed signals, each assigned to separate individuals.

It is another object that when an individual gains access that his identification and time of entry be recorded by a self-contained memory.

It is a further object that if a signal is presented that is not an authorized signal, then the lock remains locked, a light will flash, and the attempt to enter will be recorded in memory.

It is yet another object that if the manually entered signal includes an appropriate operation code, then the operation of the lock and the recording and transmitting of data will proceed in a manner determined by the operation code.

It is another object that the operation codes may be conveniently written into the door-mounted self-contained memory, or erased therefrom by preprogrammed means that permits rapid changing of access codes in large numbers of locks without repetitive entry of the changes; i.e., by a macro system.

It is an object of this invention that, when the initializing signal is generated by a program monitoring a clock, the device will operate in either one of three access modes—a mode in which the door remains unlocked, a mode in which the door remains locked, a mode in which entry by an authorized user is enabled only by his/her inputting a proper pre-assigned code.

Still other objects are evident from the specification, claims, and drawings hereof.

DRAWINGS

FIG. 1 is a block diagram of the major components of the invention.

FIG. 2 is a front view of the security device mounted on a door.

FIG. 3 is a rear view of the device mounted on a door.

FIG. 4 is an assembly side view of the device separate from the door.

FIG. 6 is a view of the coupling mechanism between the motor and the plunger that moves the lock bolt.

FIG. 7 is a block diagram of the integrated circuit logic devices that comprise the control circuitry and are attached to the printed circuit board.

FIG. 8 is a detailed circuit schematic of the block diagram presented in FIG. 7.

FIG. 9 is a flow diagram of a master control program written for the circuit of FIG. 8.

SUMMARY

Figure 5:
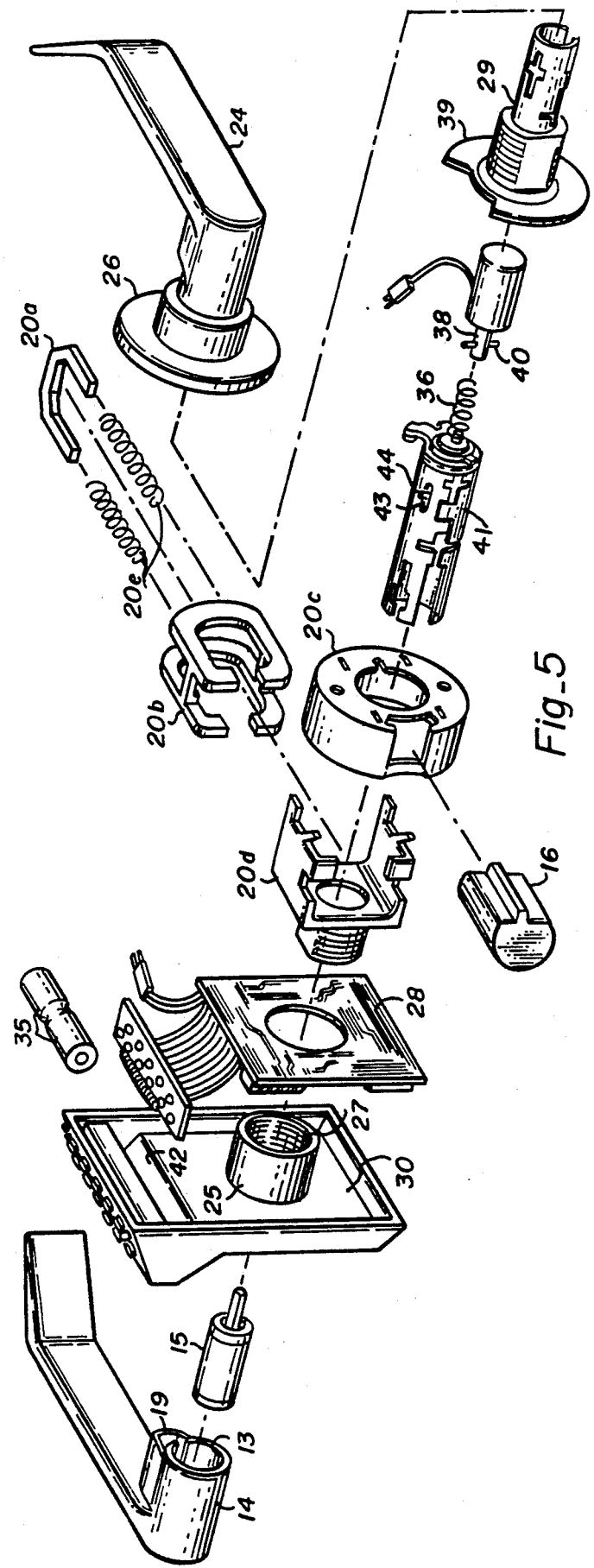
FIG. 5 is an exploded view of the device as shown in FIG. 4.

This invention is directed to a door-mounted access control system employing a programmable circuit which operates an electromagnetic device such as a motor or solenoid to control a lock in response to a code entered through a keyboard, and/or in response to a chronological schedule enabled by a clock. A central feature is an LED in the system to provide a wireless link (preferably IR) to a hand held printer. The door-mounted system may be programmed with access codes and a time schedule which communicate to the wireless printer via the LED to print out a list of users and times of entry. In the best mode, programming is preferably accomplished with the same keyboard used to gain entry. Programming may alternately be done by use of the printer keypad via an IR link to a sensor in the door mounted assembly.

A preferred embodiment is a locking mechanism that is activated by a small battery-powered motor. The door handle is attached to a shaft (known in the art as an outside spindle) such as typically engage a door latch wherein the outside spindle has a bore to house a plunger that is the keying element between the outside spindle and latch. The plunger is uniquely coupled to the motor so that the rotation of the motor moves the plunger between the locking and unlocking position in response to an electrical signal to the motor. The signal may be entered manually, such as may be entered through a keyboard (keypad), or, alternatively, the signal may be related to real time as marked by a clock. In either case, the response is determined by one of many programs that may be written into a solid state logic control circuit that is an integral part of the device (the unit mounted on the door). The programs are preferably written into the control circuitry using the same keyboard as is used to input the entry signals.

The unique selection of motor and battery, construction of the plunger and layout of the keyboard and printed circuit board provides a compact package (assembly) that incorporates (encircles) the door knob, and typically covers only 3"×4.5" of door area. The small keyboard, located just above the door knob, is angled so that a user can conveniently operate the board standing in front of the door or even sitting in a wheel chair.

The plunger and motor shaft are coaxial and coupled by a novel arrangement comprising a helical spring which has one end attached to an end of the plunger, and encompasses the motor shaft. A cross pin is fixed through the shaft to engage the spring. Therefore, the spring functions like a "resilient cam" in that if the motor shaft turns in one direction, the pin slides along the spring which forces the plunger to move toward the motor. When the motor shaft turns in the opposite direction, the plunger moves away from the motor, being urged by the spring. If the plunger is inadvertently immobilized such as when a user holds the handle while the motor is turning, a section of the spring will be compressed as the motor turns in accordance with the operative program. As soon as the immobilizing factor is removed (the handle is released), the spring forces the plunger in the direction determined by the initial direction of rotation of the motor.

The onboard controlling circuitry comprises a keyboard for manual signal and program input; a memory section such as an EPROM or ROM for storing programs; a memory section such as a RAM for storing data; a clock that stores real time; and a microprocessor responsive to programs in memory combined with the signal input by the keyboard and/or clock, to control the motor or the light emitting means by which the device communicates with the hand-held printer. By "onboard" I mean disposed in association with the door-mounted assembly.

Additional features of this invention include programs that have been written for the device. Programs presented in the preferred embodiment include the use of individual user codes; a user code consisting of group of numbers in which part of the numbers identifies the user so that an entry log printout need only include that identifying part and the remaining part need not be included in reports intended for general distribution; an auto code in which the microprocessor generates a random list of numbers for assignment to the users; and a programming technique which feeds a program as it is being entered into the keyboard back to the hand-held printer through the wireless link so that the user can continually check on his entries to detect errors.

Yet another feature of this invention is a method of maintaining performance of the device which is accomplished by adjusting the time that the motor is turned on based on the number of time the motor and light emitting diode has been turned on and the length of time that the logic circuit has been activated.

These best mode programs illustrate the versatility of operations that can be performed while advantageously employing the novel mode of incorporation of the low power motor, the unique coupling device and combination of solid state components. Variations of these and other programs may be programmed into the device to suit specific applications as needed.

The integrated access control/door lock device of this invention is characterized as having means of identifying and recording access use activations by individual valid users, means for providing the stored access information (passages through the door) to an administrator or security chief, means for unlocking and relocking a physical barrier, commonly a door, and means for entry of individual and access codes and for programming and reprogramming the functions and memory of the unit. It is important that all of these basic means are included in one integrated device that is wrapped around or integrated into a physical part of a door lock or other means for locking/unlocking a physical barrier. In the most preferred embodiment, the means for providing the recorded information to the administrator or security chief is an infrared link to a conventional hand-held printer. I prefer the keypad to be ergonomically located on the top sloping surface of a wedge-shaped exterior housing employing two rows of metal buttons or keys that has a standard door handle/locking mechanism to which the access permitting signals are passed via wires to a motor located on the inner-side within the outside spindle. I prefer the keyed code to be formatted to incorporate both a user ID number embedded with or interleaved with an access code. While I prefer a 3-digit user ID with a 4-digit access code, any variation of 2-5 numbers for each could be employed. Greater numbers can be used if there are a larger population of individuals to whom access is to be provided or to "bury" proper access codes within a larger universe of numbers so that access can be denied to persons trying a large number of random combinations. I also prefer to use an onboard random generating function to generate new user ID's and/or access codes. I prefer to use the access code/user ID code as sequential parts of a larger number, but they may be interleaved to make access deciphering more difficult. It should also be understood that the IR link may be two-way so that punching a single key, or two or three keys on the hand-held printer could transmit signals to the access control/door lock system of this invention. This would be extremely useful in the case of reprogramming a large number of door locks within a short period of time. Thus, for example, in a large installation such as the military where there are a large number of the access/control door lock systems of this invention employed, an MP or other line-enforcement type officer can circulate to all the doors punching a single "macro" key on a hand set that has been provided that is already reprogrammed, thereby transmitting an entire new program or set of programs to the access control/door lock unit of this invention via the IR link. Thus, for example, a single macro could set up a complete change of timing signals or restricting or changing access to particular individuals. The macro could either be on the hand-held printer or could be preprogrammed into the ram memory of the access control portion of this invention so that the line personnel could either use the hand-held printer or the key pad on the door installation itself. The device of this invention installs an almost any standard 2⅛" door hole with no visible modifications to the door. The low-powered drive system converts rotary action of a very low powered motor, less than 10 milli-amp current draw, to linear action using a single spring backlash compression, backlash extension as a drive cam. The 11-digit key pad offers the greatest center-to-center distance of keys in the least amount of depth, that is distance from the door face. It also contains the least number of buttons to be fully useful in providing a large number of key combinations, and is simple in appearance and function.

Regarding the access code, it is not necessary that every user have the same access code. It is important that what is printed out is only the 3-digit ID code so that the individual access code, akin to a credit card user's PIN, by not being printed out on hard copy does not fall into the wrong hands. There are over 10,000 4-digit combinations available. In addition, a facility code can be programmed into the unit, such as a 6-digit code providing some 10 million different combinations. This can be manually added, or added by an autocode, comprising a pseudo-random generation algorithm that generates up to 50 different random codes. Then one can go to all other locks in the same building and enter the same facility code provided an extra level of security. The infrared printer link has a range of about 2′ and no FCC license is required as in the case of a RF interlink. Once the lock is activated, the latch will retract for approximately two seconds, which is sufficient time to open the door. Typically the latch is then released (returned to the locked position) before the person is through the door, so that immediately upon the door handle being released and the door closure returning the door to its closed position, the door is already locked. This prevents a second, unauthorized person from following through on the heels on an authorized entrant. The system of this invention can be programmed so that the lock remains open for a long period of time, such as during normal working hours without power drain as in the case of solenoid. The motor retracts the plunger and the power to the motor is turned off. The plunger does not retract thereby relocking the door. In addition, the onboard program provides in its menu user prompts to assist in selecting the desired printout. The three separate access modes include: a) the normal use mode, which is the code-required mode to ensure access is allowed only to authorized personnel; b) the unlocked mode, which is used during high traffic use or accountability is not needed, this being a mode to permit free access; and c) a locked mode, which denies access after hours or during holiday shutdown periods. The changeable pre-programmed time lock feature allows the system of this invention to automatically changed between the three access modes, typically up to eight times per day, as determined from the programable time schedule desired by the user. A key bypass can also be provided. A key is shown in phantom in FIG. 4.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

The principal components of the door mounted assembly of this invention are represented by the blocks in the schematic diagram presented in FIG. 1. They include a signal input means (a keyboard), 2, a control means 4 to activate an IR emitter 6; a motor 8 which activates the lock 10, and a power supply (battery) 12.

An overall view of the security device assembly of this invention installed on a door, is presented in FIG. 2 where there is shown an isometric front view of the security device 11, comprising a front housing cover 17, the door handle 14 with a key barrel 15, the door bolt 16, a keyboard with eleven keys 18 a LED (light emitting diode) 37, and yellow and green check lights 31 and 33, all shown as part of the security lock assembly package. By comparing the size of handle 14 and cover 17, one of the features of the invention is illustrated, namely that the selection and packaging of components provides a convenient overall size that is comparable to the dimensions of the handle and that expensive modification of the door to accommodate the device is unnecessary. There is also shown above the device a hand-held printer 23 that receives data signals 21 for print out which signals are emitted by the LED emitter 37. A suitable hand-held printer that may be used is one manufactured by the Hewlett-Packard Company, Cupertino, Calif.

In FIG. 3, the opposite side (secure area side) of the door is shown. Note that only the standard rear handle 24 and retaining flange 26 adjacent the door's edge 22 are involved. The unit 11 does not project onto that side.

FIG. 4 shows a view of the assembled device separate from the door, and FIG. 5 shows an exploded view of the individual parts. There are shown the front handle 14 having an aperture 13 and groove 19 to receive key barrel 15. The interior 30 of the cover 17 has an attached collar 25 with an internal thread 27. A circuit board 28 has an opening 32 through which collar 25 passes so that the circuit board can nest against the inside 30 of the cover. The battery 35, nests in the inner cavity 42 of cover 17 when assembled. Conventional attachment parts 20a, b, c and d which engage the latch 16 are adapted to fit onto the outside spindle 41 which houses the plunger 34.

Parts 14, 15, 16, 20a, b, c, d, e, 24, 26, 29, 34 and 41 are lock hardware parts that can be conventional lock parts currently commercially available. In some locks of the prior art, a spring-loaded push button shaft is located in the inside spindle 29. This push-button shaft has the "push-button end" protruding from the inside door handle and the other end abuts the plunger. When the push-button is pushed by a user, the plunger is pushed to the locking position. In one embodiment of this invention, a solenoid may be positioned in place of the push-button shaft and operated using logic circuitry to control the solenoid in accordance with programs written into memory. The circuit may include the LED as a wireless link to a hand-held printer to which data concerning user identification and time of entry may be transmitted. In the preferred best mode embodiment, the plunger is attached to one end of a helical spring 36 whose other end encloses a shaft 38 of miniature d.c. motor 8. The motor is housed axially coordinate with both the "inside spindle" 29 and the spring 36. The motor is held fixed by retaining ring 39. The spring 36 is slidably engaged to the motor shaft by a cross-pin 40, which is fixed to the motor shaft 38.

The novel coupling between the motor shaft and plunger shown in FIGS. 5 and 6 is a central feature of this invention. An enlarged, simplified illustration of this feature is presented in FIG. 6 for further clarification of its operation. Referring to FIG. 6 there is shown the motor 8 and motor shaft 38. A helical spring 36 slidably encloses the motor shaft at one end. A cross pin 40 passes through the motor shaft and spring. The other end of the spring is attached to an end of the locking plunger 34 which is allowed to move along its axis back and forth and is keyed by crosspin 44 to a slot 43 in the outside spindle 41. The locking plunger activates latch rectractor 20b in lock housing elements 20c and 20d to activate latch 16 in the conventional manner. Parts 20a and e are the latch return spring assembly.

Under normal conditions, the motor shaft turning clockwise will cause the cross pin, in sliding engagement with the spring, to move the plunger toward the motor whereas, when the motor shaft turns counter clockwise, the plunger moves in the opposite direction.

The great advantages of the spring of this invention is that it is inexpensive and is readily available in a variety of pitches.

A second condition encountered in the operation of the spring coupler is when the locking plunger is kept from returning to the locked position by external means, such as someone keeping the door knob turned while the motor is programmed to relock it. The motor will simply cause the spring to compress as the plunger remains fixed. Then, when the external force is removed (i.e., the person lets go of the knob) the spring will expand and the plunger will move to the unlocked position.

The third condition is similar to the second condition except that if the plunger is held fixed in the locked position, e.g., by putting pressure on the door knob (handle 24), even though it is locked, the shaft will turn, placing the spring under extension. Then, when the pressure is released, the plunger will jump to the unlocked position.

Therefore, in accordance with the invention, a simple spring has replaced a cam and two springs. Furthermore, the novel construction of the coupling and lock makes possible the use of a very low power DC motor to operate the locking mechanism. For a typical application, a Maxxon model 2912 DC motor is used which may be powered by a lithium battery such as Panasonic BR 2/3A. This battery will operate the system for seven years under typical conditions and its small size makes possible conveniently including the battery into the package configuration.

There are a number of circuits that may be devised to perform the controlling functions in accordance with a variety of programs written for the system and all of them fall within the scope of this invention. One general configuration into which useful programs can be written is shown in FIG. 7. There is shown a keyboard 45, a microprocessor 46, an EPROM 48 and a RAM 50 with a latch 52, and a clock 54. A bus 56 for selected columns and rows in the keyboard is shown leading from the keyboard to the microprocessor. Address lines 58 (A) lead from the microprocessor to the EPROM and the RAM. Combination ADDRESS and DATA buses 60 (A,D) are connected from the microprocessor to the EPROM, RAM and LATCH and from the microprocessor to the EPROM, RAM, LATCH and CLOCK. A READ-WRITE bus is connected between the microprocessor and the RAM. Lines controlling motor stall, and clockwise/counter-clockwise rotation of the motor lead from the microprocessor to the motor. An emitter line leads from the microprocessor to the (red) LED 37 to provide the wireless link to a hand-held printer. A line from the microprocessor to another (green) light 33 signals when the lock is open or when the battery is "good". A line to a yellow light 31 signals a warning.

A more detailed schematic version of the circuit shown as a block diagram in FIG. 7 is shown in FIG. 8. Component values are listed in Table 1 below.

FIG. 9 shows the flow diagram of a master control program that may be operated by the logic system illustrated in FIG. 7 with a more detailed version in FIG. 8. Referring to FIG. 9, when the control program is inactive, the system is in a low power "sleep" mode. In step A, a signal has come in that "wakes" the system from the "sleep" mode, e.g., a signal from the keyboard, clock or an initializing signal (such as from the printer), and initiates the program in step B. At decision step C, if the signal is determined to be an input from the keyboard, then in step D, the key signal is stored in memory. At decision step E, if the number of keys hit is less than 7, the system will return to the low power mode (via step EA) to await the next key signal. When seven key signals have been received, decision step F is reached. If the signal into the keyboard is not a "program" code, then at G, the system will compare the signal with a user list stored in RAM. If the signal is valid as determined at decision step H, then in step J, the lock is opened. At the next decision step K, battery charge is checked and a green LED flashes if the battery charge is satisfactory and a yellow LED flashes if the charge is low signaling that the battery should be replaced.

TABLE I

PIN CONNECTIONS AND COMPONENT VALUES FOR FIG. 10

| | U-1<br>MICRO-PRO<br>= 80C31 | U-2<br>EPROM<br>= 27C64 | U-3<br>RAM<br>= 84C64 | U-4<br>CLOCK<br>= 74HCT373 | U-5<br>LATCH<br>= RP5C15 |
|---|---|---|---|---|---|
| 1 | | Vpp | | xsel | ale |
| 2 | row 1 | | A12 | rtcsel | A0 |
| 3 | row 2 | A7 | A7 | | AD0 |
| 4 | row 3 | A6 | A6 | A0 | AD1 |
| 5 | row 4 | A5 | A5 | A1 | A1 |
| 6 | cw | A4 | A4 | A2 | A2 |
| 7 | ccw | A3 | A3 | A3 | AD2 |
| 8 | ledg | A2 | A2 | read | AD3 |
| 9 | ledr | A1 | A1 | ground | A3 |
| 10 | rst | A0 | A0 | write | ground |
| 11 | print | AD0 | AD0 | AD0 | ale |
| 12 | | AD1 | AD1 | AD1 | A4 |
| 13 | xsel | AD2 | AD2 | AD2 | AD4 |
| 14 | motor stall | ground | ground | AD3 | AD5 |
| 15 | col 1 | AD3 | AD3 | alarm | A5 |
| 16 | col 2 | AD4 | AD4 | osc in | A6 |
| 17 | col 3 | AD5 | AD5 | osc out | AD6 |
| 18 | read | AD6 | AD6 | Vcc 2 | AD7 |
| 19 | write | AD7 | AD7 | | A7 |
| 20 | xtal 1 | psen | ce 1 | | Vcc 3 |
| 21 | xtal 2 | A10 | A10 | | |
| 22 | ground | psen | read | | |
| 23 | | A11 | A11 | | |
| 24 | A8 | A9 | A9 | | |
| 25 | A9 | A8 | A8 | 27c74 manuf. by Intel | |
| 26 | A10 | ale | ram sel | 80c31 manuf. by Intel | |
| 27 | A11 | p | write | 84c64 manuf. by Hitach | |
| 28 | A12 | Vcc | Vcc | 74hct373 manuf. by RCA | |
| 29 | ram sel | | | rp5c15 manuf. by Ricoh | |
| 30 | rtc sel | | | | |
| 31 | on | | | | |
| 35 | ground | | | | |
| 36 | AD7 | | | | |
| 37 | AD6 | | | | |
| 38 | AD5 | | | | |
| 39 | AD4 | | | | |
| 40 | AD3 | | | | |
| 41 | AD2 | | | | |
| 42 | AD1 | | | | |
| 43 | AD0 | | | | |
| 44 | Vcc 1 | | | | |

| c1 = .1 microfd | tc1 = 6-20 pfd | D1 = 1n914 | B-battery 3 V |
| c2 = .001 microfd | x1 = 32.7 khz | r1 = 10k | J-connector |
| c3 = 20 pfd | L1 = 150 microhen | r2 = 330 | |
| c4 = .01 microfd | Q1 = pn2222 | r3 = 3.3k | |
| c5 = 100 pfd | Q2 = pn2907 | r4 = 20 | |

At step L, the entry is recorded in the auto log memory section of the RAM. The lock is then closed at step M after an appropriate time delay. The keyboard action register is reset to 7 at step N and at step P, the system re-enters the low power "sleep" mode.

If at step G, it is determined that the signal is not valid, then at decision step H, the program will switch to step H.A. Wherein an unauthorized entry will be recorded in the audit log section of memory. A red light will flash at step H.B. Control will then return to step N so that the keyboard action register will be restored to 7 and the system will enter the low power "sleep" 60 mode.

If the user has entered a master code into the keyboard, then this fact will be detected at decision F and a yellow LED will flash at step F.A and, at step F.B, the system will take action specified by the program status level. At step F.C, a prompt (or instruction in the program may be printed as an aid to the user). The system sets a new program status level at step F.D and sets the new keyboard action level at step F.E. Thereafter, the system returns to the low power "sleep" mode at step P.

If, at step C, it has been determined that the initiating signal was not entered at the keyboard but originated when the clock reached a programmed time (e.g., starting time, quitting time, lunchtime, etc.) then control moves to step C.A where the real time is read from the clock into the RAM. At step C.B, the schedule in memory is searched for the step in the master program to be selected corresponding to the real time. The three choices are—C.B.B where the doors are unlocked at all times such as during an open house; C.B.A where the doors are locked at all times such as on holidays; C.B.C where the door may be opened by a single code known to all authorized personnel. At step C.C, the system implements the selected access step and at C.D., the entry is recorded into the audit log.

Thereafter, the system will return to the low power "sleep" mode via step P.

Referring back to step K of FIG. 9, it must be emphasized that testing the battery is an important part of the method in order to ensure reliable operation of the system. The customary procedure for estimating battery life is to measure internal resistance of the battery. The internal resistance of alkaline batteries increases steadily with use so that with alkaline batteries, one may forecast a point where the charge is depleted simply by measuring the voltage output.

However, the internal resistance of the preferred lithium batteries is much more constant throughout the life of the battery until the charge is nearly completely depleted. Consequently, measurement of voltage cannot be relied upon to forecast the end of battery life. The problem of predicting end of life for lithium batteries has been resolved by a unique feature of this invention which is to maintain in memory a "count" number of the power consuming operations performed by the device, i.e., turning on the motor, turning on the LED, and measuring the time that the clock is running, in order to signal when estimated charge left on the battery is reduced to an inoperative value. The count number also serves the purpose of controlling the length of time that the motor runs in each operation. This is necessary because the current from the battery decreases as the battery ages (due to increased internal resistance) so that the speed of the motor decreases as the battery ages. Therefore, the circuit logic increases the time that current is applied to the motor in accordance with increases in the count number. This technique results in a longer useful life of the battery.

The circuit means for accomplishing this operation is presented in the circuit diagram of FIG. 8 for a given current output.

Of the many programs that can be entered into memory and accessed at step F, the "split code" program that separates the users identity from his entry number is useful for demonstrating the versatility of the system. According to this program, three numbers of the users code identify the user and four numbers are his personal access number. The user must enter all seven numbers to gain entry. However, when entry data is printed out on the hand-held printer, this program will print out only the identifying portion of the numbers (the User ID#) so that if unauthorized personnel obtain the printout, the access number will not be revealed. This is an important security feature.

The printout from memory is obtained by holding a Hewlett-Packard hand-held printer in the line of sight of the wireless LED link and pressing the appropriate code on keyboard 18 to print out the data in memory.

In another program mode, when a program is being entered into memory, the printer may be positioned so that the users entries into memory are simultaneously printed out on the printer so that the user can detect mistakes as he is keypunching.

Another advantage of the system is the simplicity of the keyboard—ten keys numbered 0-9 plus a "clear" key (11 keys in all). Therefore, the keyboard can be mounted on a small, slanted panel that is conveniently accessible to people of all statures including people in wheelchairs.

Because the unique motor/spring coupling construction and logic circuitry require very little power, (less than 30 ma current draw) and because the device settles into a low power "sleep" mode when the lock mechanism is not operating, the device may be run off a pair of long-life 3 volt miniature lithium batteries that will last for many operations.

An additional space saving technique is a printed circuit board with a hole in its center so that the entire locking mechanism extends from the outside door handle, through the center of the board to the inside door handle.

Because of all these space conserving features, the entire system is contained in a package that covers a door area of only three by 4.5 inches and may be installed in most standard 2⅛" door holes with no more than the customary door lock preparation to the door (i.e., drilling the 2⅛" hole and the cross hole for latch 16).

It should be understood that various modifications within the scope of this invention can be made by one of ordinary skill in the art without departing from the spirit thereof. For example, while a key (button) code is employed here that has a user ID number embedded or interleaved with an access code, we can employ a fingerprint recognition scanner pad, voice recognition means, retina scanner or the like for positive ID permitting lock activation. While the possible means for providing audit information to an administrator or security chief include a fixed wire link to a printer, display or memory, a jack for temporary plugging in a hard wire or optical transfer cable, or RF communication, I prefer infra-red (IR) as described herein. While the detailed description has focused on door locks (knob sets or handle sets), the system and apparatus of this invention are equally applicable to safes, panic device hardware, deadbolts, electromagnetic fire-safety locks and the like. The integral access control/door lock unit of this invention, in the alternative to being mounted on the door, could be mounted adjacent the door (as in a wall-mounted deadbolt), or wrapped around or integrated into the physical part of a door lock mechanism. I therefore wish my invention to be defined by the scope of the appended claims as broadly as the prior art will permit, and in view of the specification if need be.

I claim:

1. A locking device comprising in operative combination:
   a) a locking mechanism having a first locked position and a second unlocked position;
   b) a plunger member having a central axis, said plunger being disposed in engagement with said locking mechanism to move said mechanism alternately into said locked and unlocked positions upon reciprocating linear motion of said plunger along its central axis;
   c) a motor having a shaft which is disposed coaxial with said plunger axis;
   d) means comprising a helical spring for coupling said motor shaft to said plunger, said coupling means being disposed to move said plunger linearly to said locked position when said motor shaft rotates in one direction, and move said plunger linearly toward said unlocked position when said motor shaft rotates in an opposite direction, said spring having a first fixed end and a second free end portion and said coupling means further includes:
      i) means for engaging said second free end portion of said spring disposed to contact individual coil faces of said spring;
      ii) said spring engaging means advances along said spring coil faces when said motor turns, to convert rotational motion of said motor shaft to linear reciprocating motion of said plunger, to move said plunger to said locked position when said motor turns in one direction and to said unlocked position when said motor turns in an opposite direction; and
   e) said coupling means permitting said motor shaft to continue rotational motion when said plunger is prevented from linear movement in response to an obstruction, and said coupling means stores energy to permit said plunger to complete its normal linear movement to said locked or unlocked position when said obstruction is removed.

2. A locking device as in claim 1 wherein
   a) said helical spring is disposed between said plunger and said motor having said first end attached to said plunger and said second end disposed to receivingly engage said motor shaft; and
   b) said spring engaging means is a transverse pin member disposed in association with said motor shaft, said pin member having a length dimension sufficient to span the coil diameter of said helical spring.

3. A locking device as in claim 1 wherein:
   a) said plunger includes a rod member, said rod member disposed to laterally extend in a direction towards said motor shaft along said central axis.
   b) said helical spring is disposed between said plunger and said motor said first end attached to said motor shaft and said second end disposed to receivingly engage said rod member; and
   c) said spring engaging means is a transverse pin member disposed in association with said rod member, said pin member having a length dimension sufficient to span the coil diameter of said helical spring.

4. A locking device as in claim 2 which includes:
   a) a programmable logic circuit means connected to said motor;

b) a data input device;
c) said data input device having means for signalling said programmable logic circuit means in response to data inputted by a user on said data input device; and
d) said motor being activated to turn said motor shaft between said locked and unlocked positions, in accordance with a program written into said logic circuit means, when an appropriate signal is sent to said programmable logic circuit means from said data input device.

5. A locking device as in claim 4 wherein said data input device comprises a keyboard.

6. A locking device as in claim 4 wherein said data input device comprises a card reader.

7. A locking device as in claim 5 wherein said logic circuit means comprises a microprocessor and a memory, at least a portion of which is selectively programmable.

8. A device as in claim 5 wherein said keyboard comprises eleven keys.

9. A device as in claim 5 wherein said keyboard is slanted for convenient operation.

10. A locking device as in claim 7 including means for communication with an independent data retrieval device for display of data to assist in programming said logic circuit means.

11. A device as in claim 7 wherein said logic circuit means responds to said signal generated by said keyboard in accordance with a first program contained in said memory and to said signal generated by said clock in accordance with a second program contained in said memory.

12. A locking device as in claim 7 wherein said logic circuit means is programmed to operate said locking device in response to appropriate data supplied by a user to said data input device.

13. A locking device as in claim 7 wherein said logic circuit means is programmed to operate said locking device to keep said locking mechanism in either of said locked or unlocked position over selected time intervals independent of user input to said data input device.

14. A locking device as in claim 10 wherein said device includes a light emitting diode (LED) connected to said logic circuit means, said LED generating an output signal received by an independent data retrieval device when data is input on said keyboard by a user.

15. A locking device as in claim 14 which includes a printer in communication via infrared with said LED.

16. A locking device as in claim 15 which includes a lithium battery.

17. A locking device as in claim 16 wherein said battery powers said device by passing less than 30 milliamps.

18. A locking device as in claim 16 which is disposed in a housing attachable to a door rotatable shaft of a handle on at least one side of said door without modification of the existing lock preparations for said door.

19. A device as in claim 18 wherein said device covers less than 15 square inches of said moveable barrier member.

20. A coupling means between a rotatable shaft having a fixed axis and a reciprocable shaft wherein the two shafts are axially parallel, which comprises in operative combination:
a) a helical spring disposed axially parallel to said shafts, said helical spring having a first fixed end and a second free end portion;
b) means for engaging said spring disposed in slidable contact with at least one individual coil face of said spring free end portion;
c) said spring engaging means being fixed in one of said shafts perpendicular to said axis thereof, said spring engaging means slidably engaging individual coil faces of the spring free end portion so that when the rotatable shaft rotates clockwise the reciprocable shaft is moved in one direction, and when the rotatable shaft rotates counter-clockwise the reciprocable shaft is moved in the opposite direction; and
d) said spring providing sufficient elasticity to permit said rotatable shaft to continue to rotate when said reciprocable shaft is prevented from linear movement in response to an obstruction so that energy is stored in said spring to permit said reciprocable shaft to complete its range of linear movement when said obstruction is removed.

21. A locking device comprising in operative combination:
a) an outside door handle, said outside door handle is turnable to provide linearly reciprocating movement to a plunger in a direction coaxial to a longitudinal axis of said plunger to cause a latch mechanism to unlock upon activation by a user;
b) an inside spindle attached to an inside door handle;
c) a motor having terminals connected to a source of power and having a motor shaft rotatable about an axis coaxial with said plunger axis;
d) a spring having a first end attached to said plunger and a second end portion at least partially enclosing said motor shaft;
e) a pin transversely secured through said motor shaft and engaging slidably individual coil faces of said spring; and
f) said spring forcing said plunger in one direction when said motor shaft turns in a first direction and pulling said plunger in an opposite direction when said motor shaft turns in a second opposite direction.

* * * * *